Patented July 22, 1952

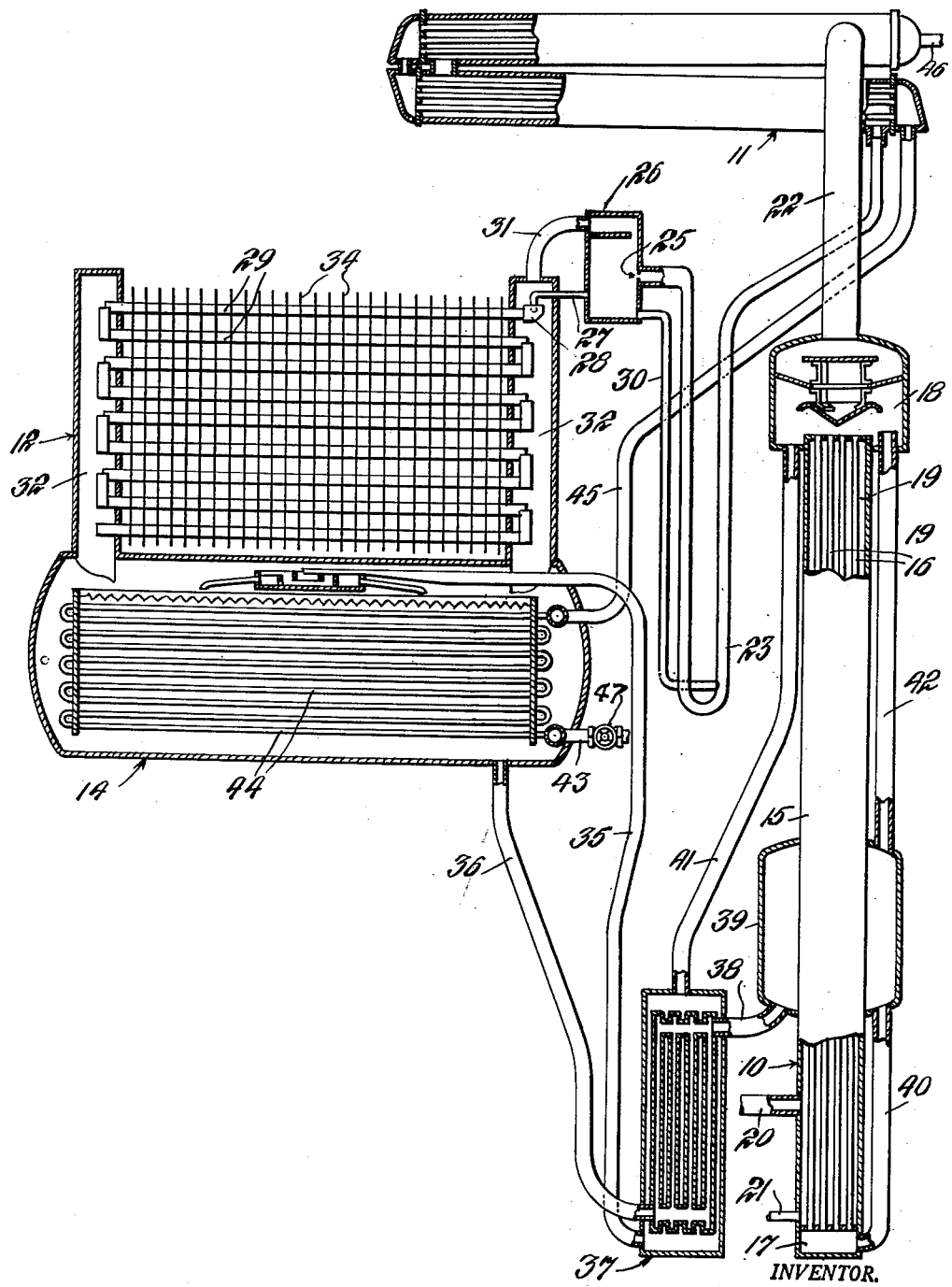

2,604,306

UNITED STATES PATENT OFFICE 2,604,306

AIR-CONDITIONING APPARATUS

Norton E. Berry, Newburg, Ind., assignor to Servel, Inc., New York, N. Y., a corporation of Delaware Application October 17, 1946, Serial No. 703,737

3 Claims. (Cl. 257—9)

This invention relates to heating and cooling wherein the same heat exchanger serves as both a heater and a cooler.

The novelty resides in blocking the flow of vapor in a certain path of flow between a condenser and the heat exchanger when cooling is desired, whereby the vapor is condensed and the liquid produced thereby flows to the heat exchanger through the certain path in sufficient quantities to do a good cooling job; and in removing the blockage when heating is desired, whereby a supply of hot vapor ample to do a good heating job flows unrestricted to the heat exchanger through the certain path; all without the use of internal mechanical valves or the like in the fluid circuits of the apparatus.

This invention, although not limited to, is particularly adapted for household air conditioning. Therefore, an excellent manner of enjoying the invention is by employing a refrigerating apparatus of the absorption type, for instance, like that disclosed in Patent No. 2,282,503 to A. R. Thomas and P. P. Anderson, Jr. Certain changes are made in the Thomas et al. apparatus which cause hot water vapor to flow to the evaporator at low pressure when heating is desired, and which cause water to flow to the evaporator when cooling is desired.

The invention, together with its objects and advantages, is set forth in more technical detail in the following description and the accompanying drawing in which the single figure shows more or less diagrammatically an apparatus for heating and cooling in accordance with this invention.

Referring to the drawing, the apparatus shown comprises basically a two pressure water absorption type refrigerating unit generally as described in the above Thomas and Anderson patent. An apparatus of this type operates below atmospheric pressure and includes a generator 10, a condenser 11, an evaporator 12 and an absorber 14 which are interconnected in such a manner that, when operating as a cooling unit, flow of fluid between the high and low sides of the apparatus is regulated by liquid columns. By "condenser" as applied to the element 11 is meant the refrigerant condenser or liquefier for cooling operations. By "evaporator" as applied to element 12 is meant the heat exchanger or air contact coil which functions as an evaporator or cooling element during cooling periods of operation, and as a condenser or heat radiator during heating periods of operation.

The generator 10 includes an outer shell 15 within which are disposed a plurality of vertical riser tubes 16 having the lower ends thereof communicating with an inlet chamber 17 and the upper ends thereof extending into and above the bottom of a separating vessel 18. A space 19 within shell 15 and about the tubes 16 forms a steam chamber to which steam is supplied through a conduit 20. Steam is supplied to chamber 19 at suitable pressures, so that the apparatus may operate as a heating unit as well as a cooling unit. Condensate formed in steam chamber 19 is withdrawn therefrom through a conduit 21.

The apparatus contains a water solution of refrigerant in absorbent liquid such as, for example, a water solution of lithium chloride or lithium bromide or a mixture of the two. With steam supplied through conduit 20 to space 19, heat is applied to tubes 16 whereby water vapor is expelled from solution. The residue absorption solution is raised by gas or vapor-lift action with the expelled water vapor forming a small core within an upwardly rising annulus of the solution. The expelled water vapor rises more rapidly than the solution with the solution flowing along the inside walls of the tubes 16.

The water vapor flows upwardly through the tubes or risers 16 into separating vessel 18 wherein the water vapor is separated from the raised absorption solution and flows through a conduit 22 into condenser 11 wherein the vapor is condensed. The liquid refrigerant formed in condenser 11 flows through a U-tube 23 and an orifice 25 into a flash chamber or separating vessel 26. The liquid refrigerant flows from the flash chamber through a conduit 27 into a distributing trough 28 and from there into tubes 29 of the evaporator. A second U-tube or trap 30, to be referred to in more detail hereinafter, is connected between the lower portion of U-tube 23 and the lower portion of flash chamber 26. A vapor conduit 31 leads from the upper part of flash chamber 26 into a header 32 of the evaporator. The refrigerant evaporates in evaporator 12 with consequent absorption of heat to produce a refrigerating effect which is utilized to cool an air stream flowing over the tubes 29. Tubes 29 are provided with heat transfer fins 34.

The refrigerant vapor formed in evaporator 12 flows into headers 32 at each end of the evaporator and from there to the absorber 14 in which the vapor is absorbed by the absorption solution which enters the upper part of the absorber through a conduit 35. The absorption solution enriched in refrigerant is conducted from absorber 14 through a conduit 36, an inner passage in a liquid heat exchanger 37, a conduit 38, a stabilizing vessel 39, and a conduit 40 into chamber 17 of generator 10. Refrigerant vapor is expelled out of solution in generator 10 by heating, and the solution is raised by gas or vapor-lift action in riser tubes 16, as explained above.

The absorption solution weak in refrigerant which has been lifted in the riser tubes 16 into vessel 18 flows therefrom through a conduit 41, an outer passage in liquid heat exchanger 37, and conduit 35 into the upper part of absorber 14. This circulation of absorption solution results from the raising of solution in riser tubes 16, whereby such solution flows to the absorber and returns from the latter to the generator by force of gravity. Vessel 39 and vessel 18 are connected by a vent conduit 42.

When the apparatus is operating as a cooling unit, the absorber 14 and condenser 11 constitute heat rejecting parts of the apparatus and are cooled by a suitable cooling medium such as water, for example, which is conducted from a suitable source of supply through a conduit 43 to a bank of tubes 44 within the absorber, whereby heat of absorption is given up to the cooling water. The cooling water is conducted from the absorber through a conduit 45 to condenser 11 in which heat of condensation is given up to the cooling water. The cooling water leaves the condenser through a conduit 46. Conduit 43 is provided with a valve 47 for cutting off the supply of cooling water to the absorber and condenser during heating periods of operation.

In operation, when a cooling cycle is first started following a shut-down on a heating cycle only a small quantity of liquid is contained in traps 23 and 30. However, with cooling water flowing to the condenser the pressure therein is such that orifice 25 offers an appreciable resistance to vapor flow therethrough at this condenser pressure, with the result that some vapor begins to condense in the condenser and this condensate is carried along with vapor to trap 23. Part of the condensate will separate from the vapor at the bottom of trap 23 and flow into trap 30 and part will be carried through the upleg of trap 23 into flash chamber 26 wherein this portion of the condensate will separate from the vapor and flow downward in trap 30 and into the bottom of trap 23 resulting in an accumulation of condensate in traps 23 and 30. Any condensate that passes through orifice 25 with vapor at the start of a cooling cycle will add to the resistance to flow of vapor through the orifice. With the resistance to vapor flow set up in the orifice and the resistance offered by the accumulated liquid in U-traps 23 and 30, pressure balancing liquid columns are soon established between the condenser and the flash chamber so that no more vapor passes from the condenser to the flash chamber. Orifice 25 is of such size that it offers substantially no resistance to liquid flow therethrough, but once liquid starts flowing through this orifice, as when cooling water is supplied to the condenser and some vapor is condensed therein, the resistance to vapor flow therethrough is appreciably increased. Once the traps 23 and 30 have been filled with liquid they stay filled so long as the apparatus is operating on normal or high load cooling cycles.

To shift from a cooling cycle to a heating cycle all that is necessary is to cut off the supply of cooling water to the condenser and absorber by closing the valve 47 in conduit 43. With the supply of cooling water cut off from the absorber and condenser, the condenser pressure rises rapidly and to the extent that trap 30 is first blown free of liquid, following which trap 23 is blown free of liquid, and hot refrigerant vapor flows at this increased pressure substantially unrestricted from the condenser through trap 23, orifice 25, flash chamber 26 and vapor conduit 31 into header 32 at the right of the evaporator. The evaporator now serves as a heat radiator or condenser wherein the hot vapor flows through tubes 29 in which the vapor is condensed giving up its heat of condensation to air flowing over the tubes. The condensate formed in the evaporator flows into the absorber and from there is returned to the generator. On a heating cycle, once the traps 23 and 30 are blown free of liquid they remain substantially free during the heating cycle.

Under certain conditions of operation on cooling cycles, flow of condensate from the condenser may fall below a certain minimum whereby the normal pressure differential between the condenser and the evaporator is not maintained. Under these conditions hot condensate may begin to flash at the top of the upleg of trap 23. This flashing may continue in trap 23 thus decreasing the density of the fluid in the upleg of this trap causing the level of liquid to fall in the downleg thereof until the trap is broken and vapor from the condenser leaks around through the trap and finally reaches the evaporator. Trap 30 is provided to take care of flashing in the upleg of trap 23. With the arrangement illustrated in the drawing, any decrease in density of fluid in the upleg of trap 23 will cause liquid to flow down through trap 30 and into trap 23. This will increase the ratio of liquid to vapor in the upleg of trap 23 thus increasing the density of the fluid at this point. This increase in density will increase both the hydrostatic and velocity head on the upleg of trap 23 sufficiently to prevent the level in the downleg of this trap from falling to the bottom of the trap. The condensate in the downleg in trap 23 will in fact seek a level such that the difference in inches between this level and the level at the top of the upleg of this trap will be approximately equivalent to the difference in vapor pressure between the condenser and flash chamber expressed in inches of water.

The conduit which forms trap 30 has an internal cross-sectional area so small as to present sufficient resistance to vapor flow therethrough when no liquid is contained therein that together with the resistance provided by orifices 25, vapor will be caused to condense in the condenser upon shifting from a heating to a cooling cycle. Trap 30, on the other hand, offers substantially no resistance to the flow of liquid therethrough. Also, as stated above, any condensate that is carried through the upleg of trap 23 into flash chamber 26 will separate from the vapor and return through trap 30 into the bottom of trap 23, thus gradually building the equivalent of a liquid column in trap 23. Thus it is seen that trap 30 performs two important functions: (1), accelerates the filling of trap 23 when the apparatus is shifted from a heating to a cooling cycle; and (2), maintains trap 23 filled with fluid which is the equivalent of a liquid column during cooling cycle operations.

Having thus described my invention, I wish it to be understood that I do not desire to be limited to the exact details of construction shown and described, for obvious modifications will occur to a person skilled in the art.

What is claimed is:

1. A heating and cooling apparatus comprising an absorption refrigerating system of the two pressure type having a still comprising a generator and a liquefier in the high pressure side, an absorber and a heat exchanger in the low pressure side, the heat exchanger serving as an evaporator or cooling element during cooling periods of operation and as a condenser or heat radiator during heating periods of operation, and conduits interconnecting said elements to provide circuits for flow of a refrigerant fluid and an absorption liquid, said conduits including a liquid trap in a conduit between said liquefier and said heat exchanger utilizing a body of liquid to bar flow of vapor from the high side to the low side during cooling periods of operation and so constructed and arranged that the body of liquid is displaced to permit flow of vapor to effect a heating period of operation upon increase in pressure in the high side as by termination of heat removal from said liquefier, and a liquid collecting chamber also in said conduit between said trap and the heat exchanger and connected by a further conduit to said liquid trap to promote reforming of said body of liquid upon decrease in pressure in the high side by delivering liquid at a rate greater than the rate of supply of liquid from said liquefier upon such pressure decrease.

2. A heating and cooling apparatus comprising an absorption refrigerating system of the two pressure type having a still comprising a generator and a liquefier in the high pressure side, an absorber and a heat exchanger in the low pressure side, the heat exchanger serving as an evaporator or cooling element during cooling periods of operation and as a condenser or heat radiator during heating periods of operation, and conduits interconnecting said elements to provide circuits for flow of a refrigerant fluid and an absorption liquid, said conduits including a liquid trap in a conduit between said liquefier and said heat exchanger utilizing a body of liquid to bar flow of vapor from the high side to the low side during cooling periods of operation and so constructed and arranged that the body of liquid is displaced to permit flow of vapor to effect a heating period of operation upon increase in pressure in the high side as by termination of heat removal from said liquefier, and a liquid accumulating chamber also in said conduit between said trap and said heat exchanger and connected by a further conduit to said trap, and said conduit has a liquid flow restricting orifice between said trap and said chamber to promote reforming of said body of liquid upon decrease in pressure in the high side by delivering liquid at a rate greater than the rate of supply of liquid from said liquefier upon such pressure decrease.

3. A heating and cooling apparatus comprising an absorption refrigerating system of the two pressure type having a still comprising a generator and a liquefier in the high pressure side, an absorber and a heat exchanger in the low pressure side, the heat exchanger serving as an evaporator or cooling element during cooling periods of operation and as a condenser or heat radiator during heating periods of operation, and conduits interconnecting said elements to provide circuits for flow of a refrigerant fluid and an absorption liquid, said conduits including a liquid trap in a conduit between said liquefier and said heat exchanger utilizing a body of liquid to bar flow of vapor from the high side to the low side during cooling periods of operation and so constructed and arranged that the body of liquid is displaced to permit flow of vapor to effect a heating period of operation upon increase in pressure in the high side as by termination of heat removal from said liquefier, and a liquid holding container connected by a further conduit to said trap to promote reforming of said body of liquid upon decrease in pressure in the high side by delivering liquid at a rate greater than the rate of supply of liquid from said liquefier upon such pressure decrease.

NORTON E. BERRY.

REFERENCES CITED

The following references are of record in the file of this patent:

UNITED STATES PATENTS

| Number | Name | Date |
| --- | --- | --- |
| 2,019,290 | Brace | Oct. 29, 1935 |
| 2,064,040 | Smith | Dec. 15, 1936 |
| 2,365,797 | Bichowski | Dec. 26, 1944 |
| 2,368,455 | Edberg | Jan. 30, 1945 |